United States Patent
Salmela et al.

(10) Patent No.: US 9,189,429 B2
(45) Date of Patent: Nov. 17, 2015

(54) COOPERATION OF DEVICE AND DISPLAY

(71) Applicant: GURULOGIC MICROSYSTEMS OY, Turku (FI)

(72) Inventors: Joni Salmela, Turku (FI); Ossi Kalevo, Turku (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 0 days.

(21) Appl. No.: 14/634,318

(22) Filed: Feb. 27, 2015

(65) Prior Publication Data

US 2015/0178227 A1    Jun. 25, 2015

Related U.S. Application Data

(63) Continuation of application No. PCT/FI2013/050840, filed on Sep. 2, 2013.

(51) Int. Cl.
| | |
|---|---|
| G06F 13/38 | (2006.01) |
| G06F 13/10 | (2006.01) |
| H04N 21/41 | (2011.01) |
| H04N 21/414 | (2011.01) |
| H04N 21/436 | (2011.01) |
| H04N 21/4363 | (2011.01) |
| G06F 3/14 | (2006.01) |
| G06F 21/62 | (2013.01) |
| H04M 1/725 | (2006.01) |

(52) U.S. Cl.
CPC ............ *G06F 13/102* (2013.01); *G06F 3/1454* (2013.01); *G06F 21/6218* (2013.01); *H04N 21/4122* (2013.01); *H04N 21/41407* (2013.01); *H04N 21/43615* (2013.01); *H04N 21/43637* (2013.01); *G09G 2370/025* (2013.01); *G09G 2370/042* (2013.01); *G09G 2370/10* (2013.01); *H04M 1/7253* (2013.01)

(58) Field of Classification Search
None
See application file for complete search history.

(56) References Cited

U.S. PATENT DOCUMENTS

| | | | |
|---|---|---|---|
| 6,473,088 B1 * | 10/2002 | Matsumoto | G06F 3/14 345/530 |
| 7,711,777 B2 | 5/2010 | Bhogal et al. | |
| 8,904,051 B2 * | 12/2014 | Lee | H04L 67/125 710/11 |

(Continued)

FOREIGN PATENT DOCUMENTS

| | | |
|---|---|---|
| EP | 2 385 689 A1 | 11/2011 |
| EP | 2 387 202 A1 | 11/2011 |
| WO | WO 2010/071269 A1 | 6/2010 |

OTHER PUBLICATIONS

Partial Supplementary European Search Report, European Application No. 13833306.7 dated Aug. 24, 2015 (5 pages).

(Continued)

*Primary Examiner* — Michael Sun
(74) *Attorney, Agent, or Firm* — Carter, DeLuca, Farrell & Schmidt, LLP; Robert P. Michal, Esq.

(57) ABSTRACT

An apparatus includes at least one processor and at least one memory including computer program code. The at least one memory and the computer program code are configured to, with the at least one processor, cause the apparatus at least to obtain a list of suitable external display devices, wherein the external display devices are on the list in a priority order. The obtaining is carried out in priority order, and couple, in priority order, to at least one of the external display devices on the list for showing content.

32 Claims, 3 Drawing Sheets

(56) References Cited

U.S. PATENT DOCUMENTS

| | | | |
|---|---|---|---|
| 2003/0071117 | A1 | 4/2003 | Meade, II |
| 2005/0036509 | A1 | 2/2005 | Acharya et al. |
| 2006/0135114 | A1* | 6/2006 | Sakai .................. H04W 4/02 455/403 |
| 2007/0220150 | A1 | 9/2007 | Garg |
| 2009/0106801 | A1* | 4/2009 | Horii .................. H04N 5/775 725/91 |
| 2009/0138921 | A1 | 5/2009 | Miyata |
| 2010/0109973 | A1* | 5/2010 | Byun .................. H04L 12/2821 345/2.1 |
| 2010/0216508 | A1* | 8/2010 | Ma .................. G06F 3/1423 455/557 |
| 2012/0094594 | A1 | 4/2012 | Rofougaran et al. |
| 2012/0110625 | A1 | 5/2012 | Bae et al. |
| 2013/0083922 | A1* | 4/2013 | Kanda .............. H04N 21/4122 380/200 |

OTHER PUBLICATIONS

PCT International Search Report which was mailed Dec. 9, 2013 and issued in a related PCT International Application No. PCT/FI2013/050840 (7 pages).

PCT Written Opinion which was mailed Dec. 9, 2013 and issued in a related PCT International Application No. PCT/FI2013/050840 (10 pages).

Applicant's Response to the Written Opinion which was dated Jun. 6, 2014 and submitted to the ISA/FI National Board of Patent and Registration of Finland in connection with PCT Application No. PCT/FI2013/050840 (18 pages).

PCT International Preliminary Report on Patentability which was completed Nov. 3, 2014 and issued in a related PCT International Application No. PCT/FI2013/050840 (7 pages).

National Board of Patents and Registration of Finland Office Action which was dated May 10, 2013, and issued in a related Finnish Patent Application No. FI20125902 (6 pages).

Finnish Patent and Registration Office Search Report 2 which was dated Apr. 3, 2014 and issued in a related Finnish Patent Application No. FI20125902 (2 pages).

Finnish Patent and Registration Office Office Action which was dated Apr. 3, 2014 and issued in a related Finnish Patent Application No. FI20125902 (6 pages).

Finnish Patent and Registration Office Communication of Acceptance under Section 29a of Patents Decree which was dated Nov. 4, 2014 and issued in a related Finnish Patent Application No. FI20125902 (3 pages).

* cited by examiner

COOPERATION OF DEVICE AND DISPLAY

CROSS-REFERENCE TO RELATED APPLICATIONS

This application is a continuation of PCT International Patent Application No. PCT/FI2013/050840 filed Sep. 2, 2013, which claims the benefit of Finnish Patent Application No. 20125902, filed on Aug. 31, 2012, the entire disclosure of each of which is incorporated herein by reference.

TECHNICAL FIELD

The invention relates to apparatuses, methods, a system, and computer programs.

BACKGROUND INFORMATION

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Mobile devices usually contain a small, or at least relatively small, display. However, a need to couple the mobile device to one or more external displays (such as a monitor, portable display monitor, video projector, near eye display or TV) often exists, for instance to watch movies, news or sport, play different games or be in social media by using a bigger screen. Sometimes a need to show content to a plurality of persons exists, and an external display or projector suits well to that kind of activity.

SUMMARY

A general aspect of the invention is to provide a quick and simple mechanism that relates to coupling an apparatus to an apparatus providing an external display.

The invention is defined in apparatuses, computer programs, methods, and a system which are characterized by what is stated in the independent claims. The preferred embodiments of the invention are disclosed in the dependent claims.

According to a first embodiment, the present invention is directed to an apparatus including at least one processor and at least one memory including computer program code, the at least one memory and the computer program code being configured to, with the at least one processor, cause the apparatus at least to obtain a list of suitable external display devices, wherein the external display devices are on the list in a priority order, the obtaining being carried out in the priority order, send a use request to an external display device having the highest priority on the list, receive a response to the use request from the external display device, and in response to receiving a permission to use the external display device, couple to the external display device for showing content.

According to a second embodiment, the present invention is directed to a non-transitory computer-readable storage medium including a set of computer-readable instructions stored thereon, which, when executed by a processing system, cause the processing system to perform the steps of obtaining a list of suitable external display devices, wherein the external display devices are on the list in a priority order, the obtaining being carried out in the priority order, sending a use request to an external display device having the highest priority on the list, receiving a response to the use request from the external display device, and in response to receiving a permission to use the external display device, coupling to the external display device for showing content.

According to a third embodiment, the present invention is directed to an apparatus including at least one processor and at least one memory including computer program code stored in the memory, the at least one memory and the computer program code being configured to, with the at least one processor, cause the apparatus at least to obtain a list of user devices enabled to use the apparatus as an external display, wherein the user devices are on the list in a priority order, and wherein a user device enabled to use the apparatus is in the list regardless whether or not it is coupled to the apparatus, receive a use request from a user device that is not coupled to the apparatus, check the priority of the user device from the list, and acknowledge the use request if the user device has the highest priority on the list of user devices, wherein a permission to use the apparatus triggers a coupling process between the apparatus and the user device.

According to a fourth embodiment, the present invention is directed to apparatus including at least one processor and at least one memory including computer program code stored in the memory, the at least one memory and the computer program code being configured to, with the at least one processor, cause the apparatus at least to retrieve a list of user devices enabled to use the apparatus as an external display, wherein the user devices are on the list in a priority order, and wherein a user device enabled to use the apparatus is in the list regardless whether or not it is coupled to the apparatus, receive a use request from a user device that is not coupled to the apparatus, check whether the apparatus is already used by another user device, and if not, check whether the user device who sent the use request is on the list, and acknowledge the use request if the user device is on the list, wherein a permission to use the apparatus triggers a coupling process between the apparatus and the user device.

According to a fifth embodiment, the present invention is directed to a non-transitory computer-readable storage medium including a set of computer-readable instructions stored thereon, which, when executed by a processing system, cause the processing system to perform the steps of obtaining a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking the priority of the user device from the list, and acknowledging the use request if the user device has the highest priority on the list of user devices, wherein a permission to use the apparatus triggers a coupling process between the apparatus and the user device.

According to a sixth embodiment, the present invention is directed to a non-transitory computer-readable storage medium including a set of computer-readable instructions stored thereon, which, when executed by a processing system, cause the processing system to perform the steps of retrieving a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking whether the apparatus is already used by another user device, and if not, checking whether the user device who sent the use request is on the list, and acknowledging the use request if the user device is on the list, wherein a permission to use the apparatus triggers a coupling process between the apparatus and the user device.

According to a seventh embodiment, the present invention is directed to a method including obtaining a list of suitable external display devices, wherein the external display devices are on the list in a priority order, the obtaining being carried out in the priority order, sending a use request to an external display device having the highest priority on the list, receiving a response to the use request from the external display device, and in response to receiving a permission to use the external display device, coupling to the external display device for showing content.

According to an eighth embodiment, the present invention is directed to an apparatus including means for carrying out a method of obtaining a list of suitable external display devices, wherein the external display devices are on the list in a priority order, the obtaining being carried out in the priority order, sending a use request to an external display device having the highest priority on the list, receiving a response to the use request from the external display device, and in response to receiving a permission to use the external display device, coupling to the external display device for showing content.

According to a ninth embodiment, the present invention is directed to a method including obtaining a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking the priority of the user device from the list, and acknowledging the use request if the user device has the highest priority on the list of user devices, wherein a permission to use the apparatus triggers a coupling process between the apparatus and the user device.

According to a tenth embodiment, the present invention is directed to a method including retrieving a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking whether the apparatus is already used by another user device, and if not, checking whether the user device who sent the use request is on the list, and acknowledging the use request if the user device is on the list, wherein a permission to use the apparatus triggers a coupling process between the apparatus and the user device.

According to an eleventh embodiment, the present invention is directed to an apparatus including means for obtaining a list of user devices enabled to use the apparatus as an external display, wherein the user devices are on the list in a priority order, and wherein a user device enabled to use the apparatus is in the list regardless whether or not it is coupled to the apparatus, means for receiving a use request from a user device that is not coupled to the apparatus, means for checking the priority of the user device from the list, and means for acknowledging the use request if the user device has the highest priority on the list of user devices, wherein a permission to use the apparatus triggers a coupling process between the apparatus and the user device.

According to a twelfth embodiment, the present invention is directed to an apparatus including means for retrieving a list of user devices enabled to use the apparatus as an external display, wherein the user devices are on the list in a priority order, and wherein a user device enabled to use the apparatus is in the list regardless whether or not it is coupled to the apparatus, means for receiving a use request from a user device that is not coupled to the apparatus, means for checking whether the apparatus is already used by another user device, and means for if not, checking whether the user device who sent the use request is on the list, and acknowledge the use request if the user device is on the list, wherein a permission to use the apparatus triggers a coupling process between the apparatus and the user device.

According to an thirteenth embodiment, the present invention is directed to a non-transitory computer-readable storage medium including a set of computer-readable instructions stored thereon, which, when executed by a processing system, cause the processing system to perform the steps of obtaining a list of suitable external display devices, wherein the external display devices are on the list in a priority order, the obtaining being carried out in the priority order, and sending a use request to an external display device having the highest priority on the list, receiving a response to the use request from the external display device, and in response to receiving a permission to use the external display device, coupling to the external display device for showing content.

According to an fourteenth embodiment, the present invention is directed to a non-transitory computer-readable storage medium including a set of computer-readable instructions stored thereon, which, when executed by a processing system, cause the processing system to perform the steps of obtaining a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking the priority of the user device from the list, and acknowledging the use request if the user device has the highest priority on the list of user devices, wherein a permission to use the apparatus triggers a coupling process between the apparatus and the user device.

According to an fifteenth embodiment, the present invention is directed to a non-transitory computer-readable storage medium including a set of computer-readable instructions stored thereon, which, when executed by a processing system, cause the processing system to perform the steps of receiving a use request from a user device that is not coupled to the apparatus, checking whether the apparatus is already used by another user device, and if not, checking whether the user device who sent the use request is on the list, and acknowledging the use request if the user device is on the list, wherein a permission to use the apparatus triggers a coupling process between the apparatus and the user device.

According to an sixteenth embodiment, the present invention is directed to a system including at least one user device including means for implementing the method of retrieving a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking whether the apparatus is already used by another user device, and if not, checking whether the user device who sent the use request is on the list, and acknowledge the use request if the user device is on the list, wherein a permission to use the apparatus triggers a coupling process between the apparatus and the user device, and an apparatus including means for obtaining a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking the priority of the user device from the list, and acknowledging the use request if the user device has the highest priority on the list of user devices, wherein a permission to use the apparatus triggers a coupling process between the apparatus and the user device.

According to an seventeenth embodiment, the present invention is directed to a system including at least one user device including means for implementing the method of retrieving a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking whether the apparatus is already used by another user device, and if not, checking whether the user device who sent the use request is on the list, and acknowledge the use request if the user device is on the list, wherein a permission to use the apparatus triggers a coupling process between the apparatus and the user device, and an apparatus including means for retrieving a list of user devices enabled to use the apparatus as an external display, wherein the user devices are on the list in a priority order, and wherein a user device enabled to use the apparatus is in the list regardless whether or not it is coupled to the apparatus, receiving a use request from a user device that is not coupled to the apparatus, checking whether the apparatus is already used by another user device, and if not, checking whether the user device who sent the use request is on the list, and acknowledging the use request if the user device is on the list, wherein a permission to use the apparatus triggers a coupling process between the apparatus and the user device.

BRIEF DESCRIPTION OF THE DRAWINGS

Some embodiments of the present invention are described below, by way of example only, with reference to the accompanying drawings, in which.

DETAILED DESCRIPTION

The following detailed description of embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, the words "comprising" and "including" should be understood as not limiting the described embodiments to consist of only those features that have been mentioned and such embodiments may also contain features, structures, units, and modules, etc. that have not been specifically mentioned.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) technology. The embodiments may also be applied to other kinds of communications networks having suitable means by adjusting parameters and procedures appropriately. Some examples of other options for suitable systems are the universal mobile telecommunications system (UMTS), radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

Figure 1:
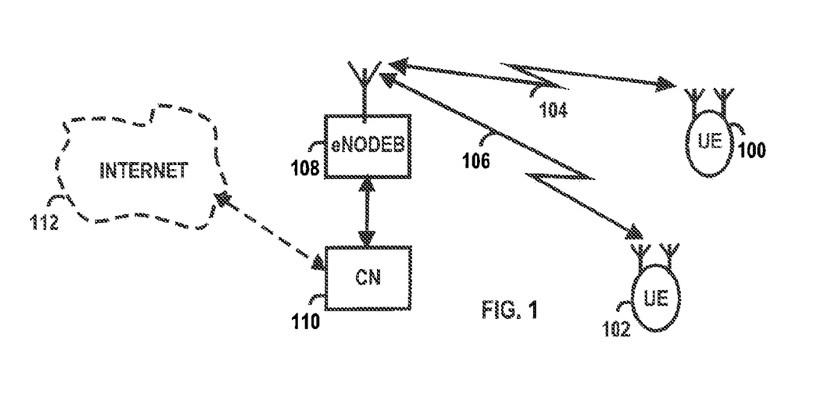
FIG. 1 illustrates an example of a system of the present invention.

FIG. 1 depicts examples of simplified system architectures only showing some elements and functional entities, all being logical units, whose implementation may differ from what is shown. The connections shown in FIG. 1 are logical connections, in practice the actual physical connections may be different. It is apparent to a person skilled in the art that the system typically includes also other functions and structures than those shown in FIG. 1.

The embodiments are not, however, restricted to the system given as an example but a person skilled in the art may apply the solution to other communication systems provided with necessary properties.

FIG. 1 shows a portion of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA =UMTS terrestrial radio access, UMTS=universal mobile telecommunications system).

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of a communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may include a plurality of antennas or antenna elements. The (e)NodeB is further connected to core network 110 (CN). Depending on the system, the counterpart on the CN side can be a serving gateway (S-GW, routing and forwarding user data packets) packet data network gateway (P-GW), for providing connectivity of user devices (UEs) to external packet data networks, or mobile management entity (MME), etc.

A communications system typically includes more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, portable media player, and multimedia device.

The user device is configured to perform one or more of user equipment functionalities. The user device may also be called a subscriber unit, mobile station, mobile device, remote terminal, access terminal, user terminal or user equipment (UE) just to mention but a few names or apparatuses. The user device may be a mobile device which may also be called a handheld device, handheld computer or simply a handheld.

Mobile devices usually contain a small, or at least relatively small, display. However, a need to couple the mobile device to one or more external displays (such as a monitor, portable display monitor, video projector, near eye display or TV) often exists, for instance to watch movies, news or sport, play different games or be in social media by using a bigger screen. Sometimes a need to show content to a plurality of persons exists, and an external display or projector is well-suited to that kind of activity. It should be appreciated that an external display may also be another mobile device. Additionally, desktops may be coupled wirelessly to an external display device. Even a need to co-work with available content by using multiple personal displays or one common display may exist. The usage of an external display may be personal or a shared experience with a larger audience. It should be appreciated that displays may also cooperate in such a manner that one is a primary display and another one is a secondary display. Multiple wired (e.g. different cables with different connectors) and wireless (e.g. WiFi, Bluetooth, cellular network, wireless high definition multimedia interface (HDMI), near field communication (NFC), etc.) mechanisms are available to couple devices and displays together.

When displays are wirelessly coupled, a complex initiation process is typically needed before the connection is established. It is even possible that a device and display may not be connected together without the aid of a professional. Thus a need to generate a more straightforward and automatic procedure to connect a mobile device and an external display exists.

It should be understood that, in FIG. 1, user devices are depicted to include two antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

One embodiment may be carried out by a device configured to operate as a user device, such as a mobile device. The embodiment starts in block 200 of FIG. 2.

Figure 2:
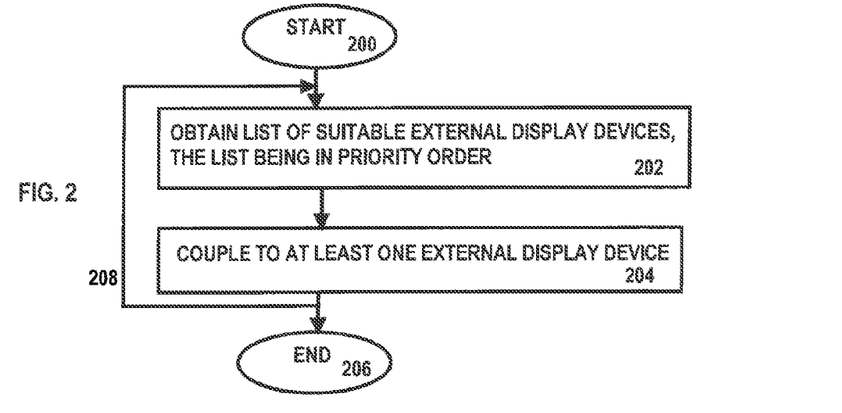
FIG. 2 is a flow chart of a method of operation of the present invention.

In block 202, a list of suitable external display devices is obtained/retrieved, wherein the devices are in a priority order. The list may be obtained external display device by external display device in the priority order.

A user device may obtain or have access to a list of external display devices which are able to automatically show the selected content of the user device. The list may include information regarding external display devices' properties and/or capabilities, such as on a screen size, video codec and transmission formats they support (e.g. do they support high definition TV). The list may be stored in a memory of the user device or it may be loaded from a remote storage unit according to a need. The remote storage unit may be provided as a cloud service, for example.

The list of external display devices is arranged in a priority order, typically in an ascending order. The list may be adapted according to changes in environment or needs automatically and/or according to user input. Examples of adapting the list include adding or removing (deleting) one or more external display devices, or changing the priority order. Some or all adaptations made in response to one or more user input may change automatically. The length of the list may also be adaptable. Thus, the list may include a varying number of external display devices, and one or more of the external display devices in the list may not be reachable at a particular moment in which the list is used, or all may be reachable. Additionally, it is possible to form clusters of individual external display devices. Hence, one device on the list may include one or more physical external display devices. Further, it should be appreciated that an external display device may be a virtual display (screen). The virtual display may be shared to several physical display devices via a local area network, for example. An example situation is that in a classroom a teacher has a main screen and the students have their own individual screens/displays, and the teacher may be coupled to all screens (displays) in the classroom, or to all individual screens in the classroom, by coupling wirelessly to one specific virtual display device, and may share via the virtual display the same or another content as via the main screen.

A wireless connection mechanism may be any connection mechanism supported by both devices, such as WiFi, Bluetooth, cellular, wireless HDMI or NFC.

The distance of devices, that is to say the distance between a user device and an external display device, may be measured based on signal strength. Also other mechanisms, for example, using location information of the devices, or timing information in signals, or ultrasonic wave, or infrared ray, to measure a distance between devices may be used. The distance of devices may contribute to the order of priority. For instance, if a user device is close or moves closer to an external display device, the priority of this display device may be moved up on the list, and if the display device is at least relatively far away or moves further away from the user device, its priority may be dropped, respectively.

Another example that may contribute to the order of priority includes the purpose of use of the space where the external display device is located. For example, an external display device in a meeting room may have a higher priority than an external display device in an auditorium, or vice versa. Also the exact location of the user device may contribute to the order of priority. For example, in a meeting room a certain place may be reserved for a secretary and another place for a chairperson. When a user with his/her user device sits at the secretary's place, the main display device in the room will have the highest priority but if the user sits at another place, some other display device will have the highest priority, assuming that it is intended that the secretary should use the main display device.

Yet a further example that may contribute to the order of priority includes frequency of use. In other words, an external display device to which the user device couples rarely has a lower priority than an external display device to which the user device couples frequently.

Changing the priority order makes the personal usage of the display device easier, but does not affect the projector usage of the display device (to at least notable extent). For example, taking the distance of the devices into consideration enables other users to use available display devices in a more flexible way. It also enables users to switch to a closer display device when moving around.

Additionally, the user that has the highest priority to an external display device may give up the priority and then the user having the next highest priority may use the external display device. If the higher priority user device needs to use the display device later on, it may request the display device from the user device currently using the external display device and some kind of "handshake" procedure may take place. The lower priority user may simply be dropped or it may be directed to another display device.

The list may be obtained/received by delivery and/or request of the list in priority order: when a user device needs access to an external display device, it may request the list from an internal memory or an outside storage device. The list may be required in priority order, for example one display device at a time, or the entire list may simply be required and delivered in the priority order from the memory or storage device.

In block 204, coupling to at least one of the external display devices on the list for showing content is carried out in the priority order. In other words, in an implementation, a use request is sent to the external display device having the highest priority, and if a negative response is received, or no response is received within a predetermined time period (the external display device is located far away or is switched off, for example), a use request is sent to the external display device having the next highest priority, etc., as long as no permission to use (i.e. no response or negative response) is received. In other words, use requests are sent until a positive response, i.e. a permission to use, is received from an external display device.

Coupling may be carried out wirelessly using any suitable technique and/or procedure. Coupling is carried out in the priority order that is to say the user device having the highest priority gets the access to the display device. In the case the user device does not have the highest priority to the display device it prefers, it may try the next one on the list and so on until it finds an external display device it is able to use. Another option is that it may queue and wait for its turn to use a particular display device.

When an external display starts showing content, the user in question gets an indication, such as a sound effect and/or an icon on an integrated display of the user device the user is using, in order for the user to become aware of the content being displayed on the display. The sound effect may be heard from the user device and/or from the display device. The user may stop the delivery by giving the priority away.

It should be appreciated that some rules or procedures to automate the usage of external display devices may be made. For example, certain sport games may be automatically directed to an external display device. Further, an external display device may be application-independent, i.e. used by any application in the user device, or application-dependent.

The embodiment ends in block 206. The embodiment is repeatable in many ways. One example is shown by arrow 208 in FIG. 2.

Another embodiment may be carried out by a device configured to operate as an external display device. The embodiment starts in block 300 of FIG. 3.

Figure 3:
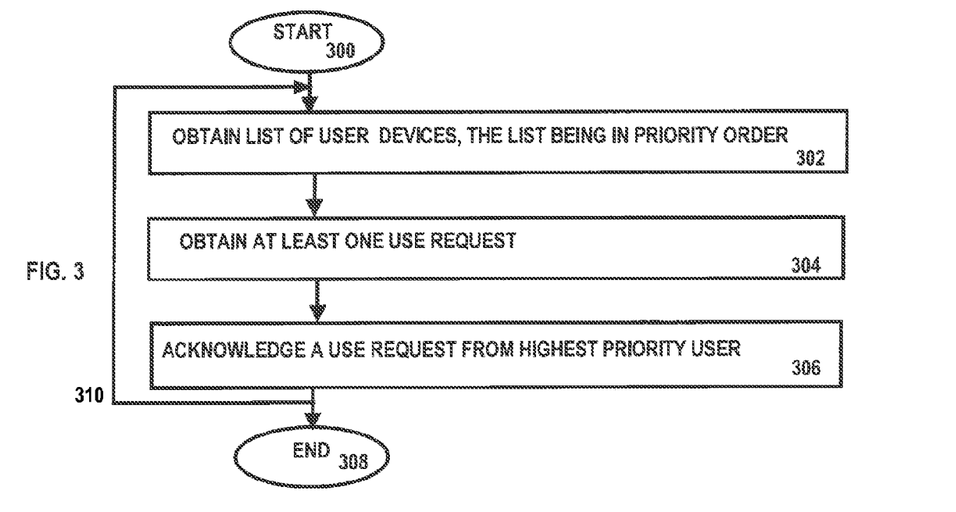
FIG. 3 is another flow chart of a method of operation of the present invention.

In block 302, a list of user devices enabled to use the apparatus as an external display is obtained/retrieved. The devices are on the list in a priority order.

An external display device may obtain or have access to a list of user devices whose content it is able to show automatically. The list may include information, like detailed information on technical properties or some general information, on the external display devices user devices may or wish to use. The list may be stored in the memory of the display device or it may be loaded from a remote storage unit according to a need. The remote storage unit may be provided as a cloud service, for example.

The list of user devices is arranged in a priority order, typically in an ascending order. The list may be adapted according to changes in the environment or needs, such as adding or removing devices, or changing the priority order. The length of the list may also be adaptable. Thus, the list may include a varying number of devices. Additionally, it is possible to form clusters of individual user devices. Hence, one user device on the list may include one or more physical user devices.

An advantage provided by the priority order includes that there exist external display devices which should be usable with numerous user devices but at the same time one should provide one or more user devices easier access to the external display devices than to the other user devices, or a person owning a user device and an external display device that the person is willing to share with other users, will be able to use the external display device with the user device whenever the person wants, thanks to the priority order, assuming that the owner's user device will have the highest priority.

Wireless connection mechanism may be anything supported by both devices, such as WiFi, Bluetooth, cellular, wireless HDMI or NFC.

In block 304, at least one use request is obtained (received).

A use request may be a message from a user device informing of the need to use an external display device. The message may be conveyed wirelessly.

In block 306, a use request from a user device having the highest priority on the list of user devices is acknowledged.

In general, an external display device is typically always used by the highest priority user. In the case none of the user devices on the priority list uses the external display device, no content may be shown. Otherwise, typically, some content is shown on the display, when the display is on.

The user that has the highest priority to a display device may give up the priority and then the user having the next highest priority may use the external display device. If the higher priority user device needs to use the display device later on, it may request the display device from the current user device and some kind of "handshake" procedure may take place. The lower priority user may simply be dropped or it may be directed to another display device. This control function may be provided by the display device, a network or carried out as a cloud service.

In one embodiment, user devices outside the list of user devices are informed of displaying capacity, if no user devices on the list of user devices are available or no use requests are obtained.

If no content is shown on an external display (no priority devices available or no access requests obtained), the external display device may inform other user devices nearby about the available display capacity. This enables other users to use the available external display devices in a more flexible way. It also enables users to switch to a closer display device when moving around. A new user device may be asked about its willingness to show content on the display device in question. Additionally, the user device may also be added to the priority list. In adding a user device to the list, the distance between it and the user device may be taken into consideration (see details on considering the distance above). Additionally, distances to user devices nearby may be measured based on signal strength as a part of informing to find out probable candidate user devices to show content. In other words, the list, and priorities, of the user devices for an external display device may be adapted as described above with the list of external display devices for a user device. For example, the user devices priority order may depend on the specific location in a meeting room. This makes it easier to change the user device whose content is to be shown on the external display device. For example, the secretary may renounce priority, and then all other participants may couple to the external display device, for example, according to requesting order.

Additionally, an external display may inform a user device when it starts showing content, for instance by an indication, such as a sound effect and/or an icon on an integrated display of the user device, in order for the user to become aware of the content being displayed on the display. A sound effect may be heard from the user device and/or from the display device.

The embodiment ends in block 308. The embodiment is repeatable in many ways. One example is shown by arrow 310 in FIG. 3. The example shows an option, wherein the list is obtained as a regular update. However, the list may be obtained after a use request, or after a first use request within a predetermined time period or after a first use request the external display device has been switched on (after being switched off).

Figure 4:
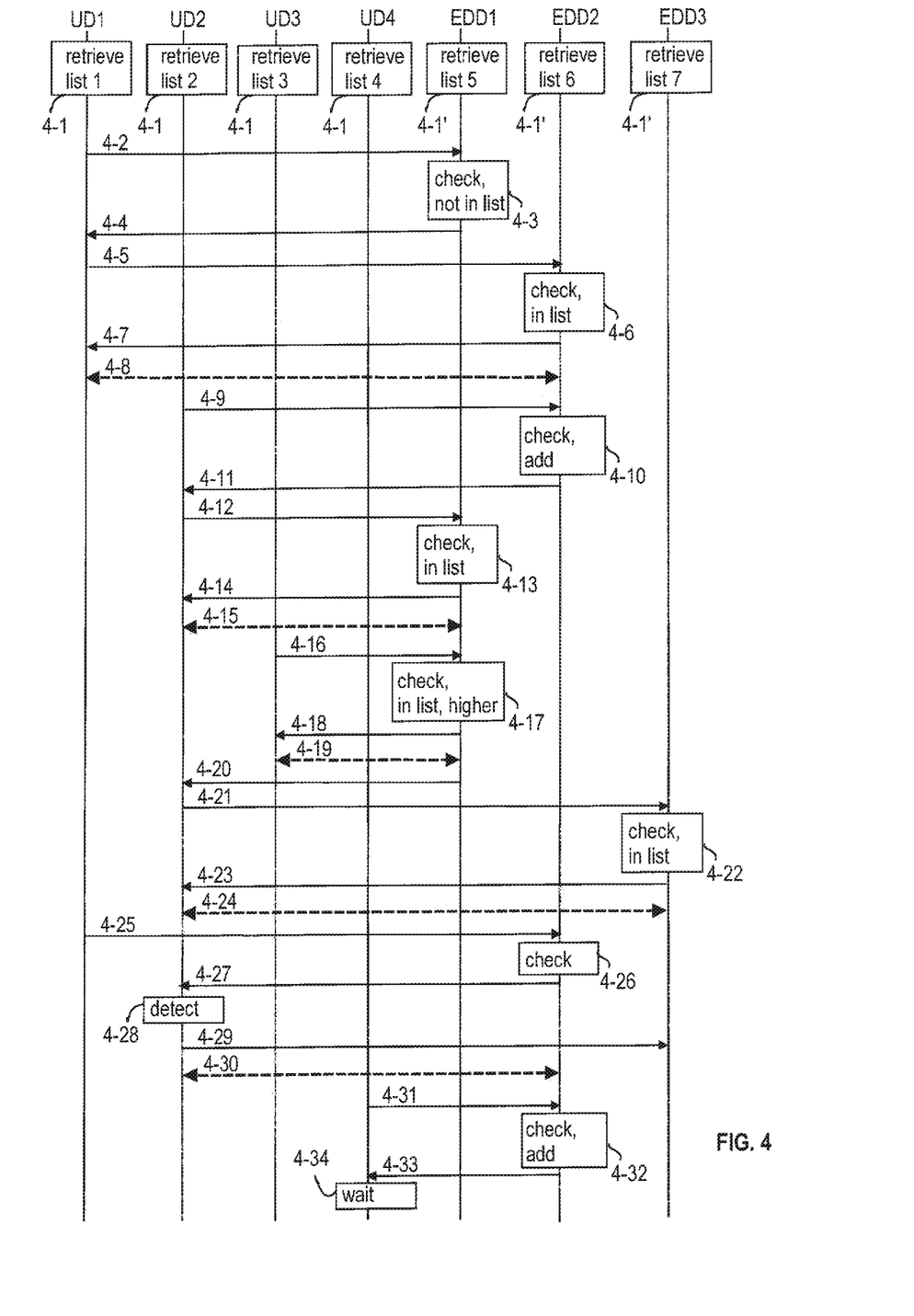
FIGS. 4 and 5 are signalling charts in accordance with the present invention.

FIG. 4 is a signalling chart illustrating exemplary signalling in an example situation in which it is assumed that a list of external display devices for a user device is a combination of a predefined external display device and sensed (detected) external display devices listing all suitable external display devices in a priority order, and a list of user devices for an external display device is a predefined list listing all user devices enabled and allowed to use the external display device. For the sake of clarity, in the example it is assumed that distances between user devices and external display devices remain stable at least after a first request-response between a user device and an external display device. In other words, the effect of movement to the priority, and hence to the use of an external display device is not illustrated.

In the illustrated example each user device UD1, UD2, UD3, UD4 retrieves its list of suitable external display devices in point 4-1 from either internal or external storage (memory), as a list 1, a list 2, a list 3, a list 4. The retrieval may be performed when the user device is switched on, or in response to a user input, or in response to entering an area for which such a list is predefined, for example. Further, in the illustrated example each external display device EDD1, EDD2, EDD3 has retrieved its list of allowed user devices in point 4-1', denoted as a list 5, a list 6, a list 7.

In the illustrated example the user device UD1 sends a use request in message 4-2 to the external display device EDD1 having the highest priority in the list 1, i.e. in the list of external display devices for UD1. EDD1 checks in point 4-3 whether or not UD1 is in the list 5, i.e. in the list of allowed user devices for EDD1, and detects in point 4-3 that the list 5 does not contain UD1. Therefore EDD1 sends in message 4-4 a negative response to the use request. For example, EDD1 may earlier have been freely usable by any user device, and thereby frequently used by UD1, but the configuration of EDD1 has been recently changed so that EDD1 has become an external display device dedicated to be used by specific user devices only, UD1 not being one of those user devices.

In response to not receiving a permission to use EDD1, UD1 sends in message 4-5 a use request to the external display device EDD2 having the next highest priority on the list 1. EDD2 checks in point 4-6 whether or not it is already used by a user device. Since at this stage EDD2 is free, EDD2 further checks in point 4-6 whether or not UD1 is in the list 6, i.e. in the list of allowed user devices for EDD2, and detects in point 4-6 that the list 6 contains UD1. Therefore EDD2 sends in message 4-7 a positive response to the use request. Since UD1 receives a permission to use EDD2, it triggers coupling to EDD2 (illustrated by 4-8).

Then UD2 sends in message 4-9 a use request to the external display device EDD2 that has the highest priority on the list 2, i.e. in the list of external display devices for UD2. EDD2 checks in point 4-10 whether or not it is already used by a user device. In the example EDD2 is configured to update priorities of user devices in list 6 so that the one currently holding a permission to use EDD2 has the highest priority. Therefore EDD2 is configured not to check the priority order of UD1 and UD2 in the list 6. Since UD1 is using EDD2, EDD2 sends in message 4-11 a negative response to the use request of UD2. Further, in the illustrated example EDD2 is configured to temporarily keep in memory information on user devices whose use requests are rejected although they are in the list 6 as pending requesters. With the information EDD2 may inform them, user device by user device, according to the priority order, about free capacity when EDD2 has free capacity. Therefore EDD2 checks in point 4-10 whether or not UD2 is in the list 6 and if it is, as it is assumed in the example, EDD2 adds in point 4-10 UD2 to a list of pending requesters. When EDD2 becomes free, it goes through the list of pending requesters using the priority order on the list 6.

It should be appreciated that user devices may be configured to poll external display devices having higher priorities than the external display device currently in use, and/or external display devices may be configured to poll user devices having higher priorities than the user device currently using the external display device and/or all listed user devices if the external device is free. If such polling is implemented, there is no need to maintain a list of pending requesters.

In response to not receiving a permission to use EDD2, UD2 sends in message 4-12 a use request to the external display device EDD1 having the next highest priority on the list 2. EDD1 checks in point 4-13 whether or not UD2 is in the list 5, and detects in point 4-13 that the list 5 contains UD2. In the example EDD1 is configured to permit its use to user devices in the list 5 according to priority order. Therefore EDD1 checks in point 4-13 whether or not it is already used by a user device. At this stage EDD1 is free. Therefore EDD2 sends in message 4-14 a positive response to the use request. Since UD2 receives a permission to use EDD1, it triggers coupling to EDD1 (illustrated by 4-15).

Then UD3 sends in message 4-16 a use request to the external display device EDD1 that has the highest priority on the list 3, i.e. in the list of external display devices for UD3. EDD1 checks in point 4-17 whether or not UD3 is in the list 5, and detects in point 4-17 that the list 5 contains UD3. Then EDD1 checks in point 4-17 whether or not it is already used by a user device. At this stage EDD1 is used by UD2. Therefore EDD1 checks in point 4-17 the priority order of UD2 and UD3 in the list 6. In the example UD3 has the higher priority, and EDD1 sends in message 4-18 a positive response to the use request. Since UD3 receives a permission to use EDD1, it triggers coupling to EDD1 (illustrated by 4-19). Meanwhile EDD1 sends message 4-20 to UD2, message 4-20 informing that UD2 will be decoupled from EDD1, and decouples UD2. (The decoupling is not illustrated in FIG. 4). Message 4-20 may contain an indication of a nearby external display device which may be used instead of EDD1, or message 4-20 may trigger in UD2 an automatic coupling to the nearby external display device (in an implementation even when the nearby external display device is not in the list 2.) In another implementation UD2 is decoupled from EDD1 only after UD2 has been coupled to, or at least received a positive response from, an external display device. Further alternatives include that EDD1 prompts the user of UD2 to provide permission to decouple UD2, or EDD1 prompts the user of UD2 that UD2 will be decoupled from EDD1 after a certain time period has lapsed thereby allowing the user to perform necessary operations to continue the session without interruption.

In response to being decoupled from EDD1, UD2 sends in message 4-21 a use request to the external display device EDD3 having the next highest priority on the list 2 after EDD1. EDD3 is configured to provide permission to use to a user device having the highest priority in the list 7. Therefore EDD3 checks in point 4-22 whether or not UD2 has the highest priority in the list 7, detects in point 4-22 that UD2 has the highest priority in the list 7, and sends in message 4-23 a positive response to the use request. Since UD2 receives a permission to use EDD3, it triggers coupling to EDD3 (illustrated by 4-24).

In the illustrated example the user of UD1 wants to stop use of external display devices. In response to the user input UD1 sends message 4-25 to EDD2 and decouples from EDD2. Message 4-25 may be a message informing that EDD2 should renounce the priority of UD1, or a message triggering decoupling, for example. (The decoupling is not illustrated in FIG. 4).

Since EDD2 has free capacity, EDD2 checks in point 4-26 whether or not it has any pending requesters. In the illustrated example there is one, UD2. Therefore EDD2 sends message 4-27 to UD2. Message 4-27 may be a positive response to the earlier use request (message 4-9) or a message advertising free capacity (which may trigger sending of a use request). EDD2 may be configured to wait for a predetermined period whether or not the pending requester couples to EDD2, and if the pending requester does not couple within the period, to send message 4-27 to the next pending requester.

In the illustrated example UD2 detects in point 4-28 that an external display device having higher priority in the list 2 than the one currently used appears as an available external display device. Therefore UD2 sends message 4-29 to EDD3, message 4-29 corresponding to message 4-25, and couples to EDD2 (4-30).

Then UD4 sends in message 4-31 a use request to the external display device EDD2 that has the highest priority on the list 4, i.e. in the list of external display devices for UD4. EDD2 checks in point 4-32 whether or not it is already used by a user device. Since UD2 is using EDD2, EDD2 sends in message 4-33 a negative response to the use request of UD4, checks in point 4-32 whether or not UD4 is in the list 6 and if it is, as it is assumed in the example, EDD2 adds in point 4-32 UD4 to a list of pending requesters.

UD4 is configured to couple (and remain coupled) only to the external display device that has the highest priority in the list 4. Therefore, in response to not receiving a permission to use EDD2, UD4 remains in point 4-34 waiting for EDD2 to become free. The procedure will be similar to the one described above, so it is not repeated in vain here.

Although in the example the external display devices are configured to act differently from each other that need not be the case. The same applies to user devices.

An advantage provided by a user device coupling to a higher priority external display device after a first failed attempt only after the user device detects that it is free is that it ensures that the user device is using the best available external display device without using network and user device capacity to frequent tests on "does the coupling succeed now".

Figures 5, 6:
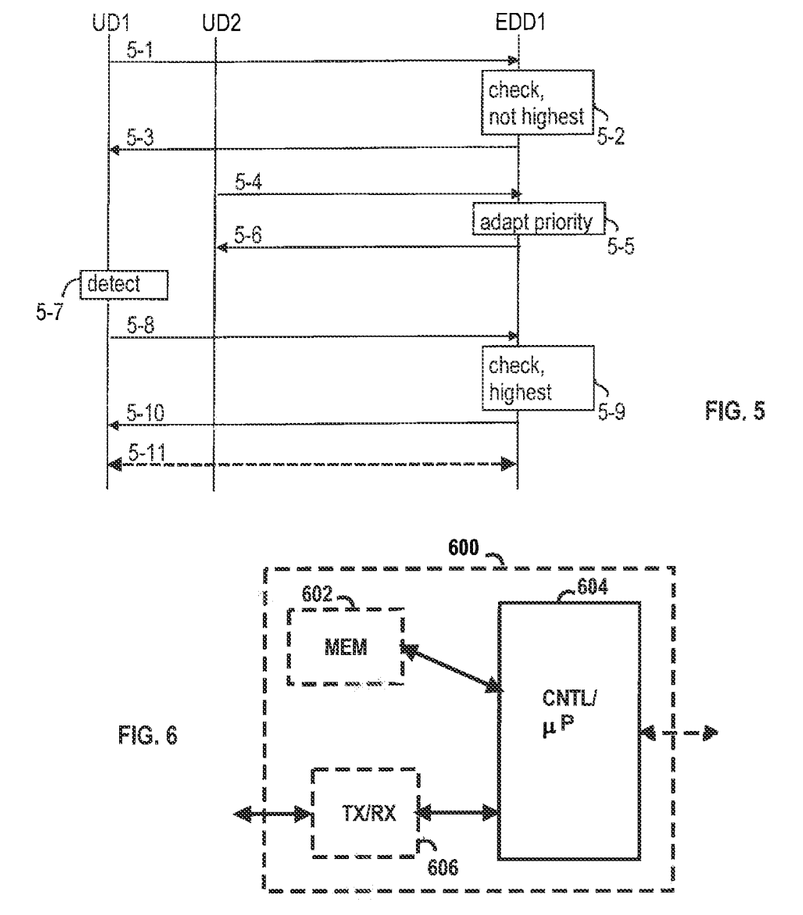
FIG. 6 illustrates examples of apparatuses which embody the present invention.

FIG. 5 is a signalling chart illustrating exemplary signalling in an example situation in which a user device UD1 represents a student A's user device in a classroom having an intelligent board, EDD1 as an external display device, EDD1 having in a list of user devices, a user device UD2 that is a teacher's user device with the highest priority and then students' user devices having lower priority/priorities. Further, EDD1 is configured to provide permission to use only to a user device having the highest priority. Further, in the illustrated example user devices are configured to wait for user input for trying to couple to an external display device but after the input and if the coupling fails (no permission to couple is received) automatically trying to couple.

FIG. 5 starts in a situation in which the user devices and EDD1 have retrieved their lists. The student A wants to use EDD1, and in response to his/her input UD1 sends in message 5-1 a use request. EDD1 checks in point 5-2 whether or not UD1 has the highest priority, detects in point 5-2 that UD2, not UD1, has the highest priority, and sends in message 5-3 a negative response to the use request. Since UD1 does not receive a permission to use EDD1, it does not couple to EDD1.

Then the teacher, who is not using EDD1, decides to grant students a permission to use EDD1. In response to the teacher's corresponding input, UD2 sends message 5-4. Depending on an implementation, the message may indicate mere renouncing of priority or it may indicate renouncing of priority and an indication of a user device which should have the highest priority, or it may be a mere indication of a user device which should have the highest priority (indirectly renouncing the priority of UD2).

In response to message 5-4, EDD1 adapts in point 5-5 the priority order of the list correspondingly, and in the illustrated example acknowledges in message 5-6 the renouncing of priority to UD2.

UD1 detects in point 5-7 that EDD1 is available and sends in message 5-8 a use request. EDD1 checks in point 5-9 whether or not UD1 has the highest priority, detects in point 5-9 that UD1 has the highest priority, and sends in message 5-10 a positive response to the use request. Since UD1 receives a permission to use EDD1, it triggers coupling to EDD1 (illustrated by 5-11).

Depending on an implementation, the renouncing of priority may be valid until UD2 sends a message reclaiming the renounced priority, or the renounced priority may be valid for a certain time period, or after a predetermined number of lower priority use requests have been accepted the renouncement is invalidated, for example. If the renounced priority is upgraded without receiving a "reclaim" from the user device, the external display device is preferably configured to allow a user device using the external display device to continue the use unless a use request is received from the higher priority user device.

Although in the examples above it is assumed that a list contains devices having different priorities, it should be appreciated that two or more devices in one list may have the same priority. For example, if an external display device is used by a first user device, and receives a use request from a second user device having the same priority than the first user device, the second user device being in the list before the first user device, the priority is not higher and therefore a negative response is sent to the second user device.

Although in the examples above an external display device is used by one user device at a time that need not be the case. It is obvious for one skilled in the art how to implement the examples when an external display device may be used by two or more user devices at the same time. An example of such a situation is two or more persons playing together, using their own user devices and sharing one external display device. The actual 2D or 3D screen of the external display device may be split in such a way that each player sees his/her view as a whole view because of different viewing directions and/or different polarizations.

The steps/points, signalling messages and related functions described above with FIG. 2 or 3 or 4 or 5 are in no absolute chronological order, and some of the steps/points may be performed simultaneously or in an order differing from the given one. Other functions may also be executed between the steps/points or within the steps/points and other signalling messages sent between the illustrated messages. Some of the steps/points or part of the steps/points can also be left out or replaced by a corresponding step/point or part of the step/point.

An embodiment provides an apparatus which may be user device, such as a mobile device, or any other suitable apparatus capable to carry out processes described above in relation to FIG. 2 and/or FIG. 4 and/or FIG. 5.

It should be appreciated that an apparatus may include or otherwise be in communication with a control unit, one or more processors or other entities capable of carrying out operations according to the embodiments described by means of FIG. 2 and/or FIG. 4 and/or FIG. 5. It should be understood that each block of the flowchart of FIG. 2 and/or point or message of FIG. 4 and/or FIG. 5 and any combination thereof may be implemented by various means or their combinations, such as hardware, software, firmware, one or more processors and/or circuitry.

FIG. 6 illustrates a simplified block diagram of an apparatus according to an embodiment.

As an example of an apparatus according to an embodiment, apparatus 600 is shown, such as a node, including facilities in control unit 604 (including one or more processors, for example) to carry out functions of embodiments according to FIG. 2 and/or FIG. 4 and/or FIG. 5. The facilities may be software, hardware or combinations thereof as described in further detail below.

In FIG. 6, block 606 includes parts/units/modules needed for reception and transmission, usually called a radio front end, receiver/transmitter, RF-parts, radio parts, radio head, etc.

Another example of apparatus 600 may include at least one processor 604 and at least one memory 602 including computer program code, the at least one memory and the computer program code being configured to, with the at least one processor, cause the apparatus at least to: obtain a list of suitable external display devices, wherein the external display devices are on the list in a priority order, the obtaining being carried out in the priority order, and couple, in the priority order, to at least one of the external display devices on the list for showing content.

Yet another example of an apparatus includes at least one processor 604 and at least one memory 602 for obtaining a list of suitable external display devices, wherein the external display devices are on the list in a priority order, the obtaining being carried out in the priority order, and couple, in the priority order, to at least one of the external display devices on the list for showing content.

It should be understood that the apparatuses may include or be coupled to other units or modules etc., such as radio parts or radio heads, used in or for transmission and/or reception. This is depicted in FIG. 6 as optional block 606.

Although the apparatuses have been depicted as one entity in FIG. 6, different modules and memory may be implemented in one or more physical or logical entities.

An embodiment provides an apparatus which may be an external display or any other suitable apparatus capable to carry out processes described above in relation to FIG. 3 and/or FIG. 4 and/or FIG. 5.

It should be appreciated that an apparatus may include or otherwise be in communication with a control unit, one or more processors or other entities capable of carrying out operations according to the embodiments described by means of FIG. 3 and/or FIG. 4 and/or FIG. 5. It should be understood that each block of the flowchart of FIG. 3 and/or point or message of FIG. 4 and/or FIG. 5 and any combination thereof may be implemented by various means or their combinations, such as hardware, software, firmware, one or more processors and/or circuitry.

Figure 7:
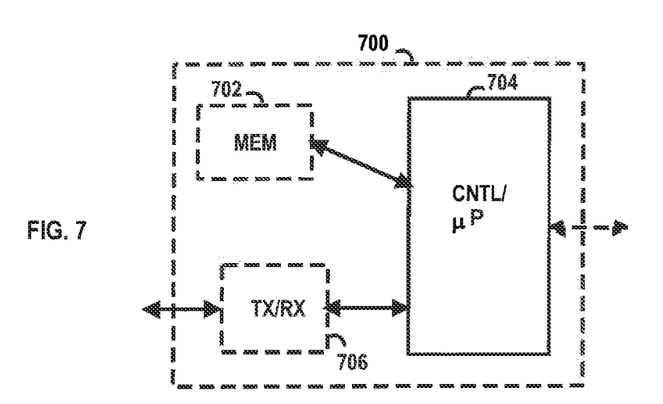
FIG. 7 illustrates another example of apparatuses which embody the present invention.

FIG. 7 illustrates a simplified block diagram of an apparatus according to an embodiment.

As an example of an apparatus according to an embodiment, it is shown apparatus 700, such as a node, including facilities in control unit 704 (including one or more processors, for example) to carry out functions of embodiments according to FIG. 3 and/or FIG. 4 and/or FIG. 5. The facilities may be software, hardware or combinations thereof as described in further detail below.

In FIG. 7, block 706 includes parts/units/modules needed for reception and transmission, usually called a radio front end, receiver/transmitter, RF-parts, radio parts, radio head, etc.

Another example of apparatus 700 may include at least one processor 704 and at least one memory 702 including computer program code, the at least one memory and the computer program code being configured to, with the at least one processor, cause the apparatus at least to: obtain a list of user devices enabled to use the apparatus as an external display, wherein the user devices are on the list in a priority order and obtain at least one use request, acknowledge a use request from a user device having the highest priority on the list of user devices.

Yet another example of an apparatus includes at least one processor 704 and at least one memory 702 for obtaining a list of user devices enabled to use the apparatus as an external display, wherein the user devices are on the list in a priority order and for obtaining at least one use request, for acknowledging a use request from a user device having the highest priority on the list of user devices.

It should be understood that the apparatuses may include or be coupled to other units or modules etc., such as radio parts or radio heads, used in or for transmission and/or reception. This is depicted in FIG. 7 as optional block 706.

Although the apparatuses have been depicted as one entity in FIG. 7, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, Pascal, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, including program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complemented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

We claim:

1. An apparatus comprising:
at least one processor and at least one memory including a computer program code, the at least one memory and the computer program code being configured to, with the at least one processor, cause the apparatus at least to:
obtain a list of suitable external display devices, wherein the external display devices are on the list in a priority order, the obtaining being carried out in the priority order, and
send a use request to an external display device having the highest priority on the list,
receive a response to the use request from the external display device,
in response to receiving a permission to use the external display device, couple to the external display device for showing content,
in response to not receiving a permission to use the external display, send a use request to an external display device having the next highest priority on the list, and repeat the sending to an external display device having the next highest priority on the list until a permission to use is received, and
measure distance to at least one external display device on the list based on signal strength for adjusting the priority order.

2. The apparatus of claim 1, wherein the at least one memory and the computer program code are further configured to, with the at least one processor, cause the apparatus to:
    adapt the list of suitable external display devices by adding devices, removing devices and/or changing the priority order.

3. The apparatus of claim 1, wherein the at least one memory and the computer program code are further configured to, with the at least one processor, cause the apparatus to:
    renounce a priority on the list and request at least one of the external display devices for use later on, if a need exists.

4. The apparatus of claim 1, wherein the at least one memory and the computer program code are further configured to, with the at least one processor, cause the apparatus to:
    obtain an indication, when at least one of the external display devices starts showing content directed to it.

5. The apparatus of claim 1, wherein the at least one memory and the computer program code are further configured to, with the at least one processor, cause the apparatus to:
    stop showing content by renouncing a priority of the external display device on the list.

6. The apparatus of claim 1, the apparatus comprising a user device.

7. A non-transitory computer-readable storage medium comprising a set of computer-readable instructions stored thereon, which, when executed by a processing system, cause the processing system to at least:
    obtain a list of suitable external display devices, wherein the external display devices are on the list in a priority order, the obtaining being carried out in the priority order, and
    send a use request to an external display device having the highest priority on the list,
    receive a response to the use request from the external display device,
    in response to receiving a permission to use the external display device, couple to the external display device for showing content,
    in response to not receiving a permission to use the external display, send a use request to an external display device having the next highest priority on the list, and repeat the sending to an external display device having the next highest priority on the list until a permission to use is received,
    adapt the list of suitable external display devices by adding devices, removing devices and/or changing the priority order,
    measure distance to at least one external display device on the list based on signal strength for adjusting the priority order,
    renounce a priority on the list and request at least one of the external display devices for use later on, if a need exists,
    obtain an indication, when at least one of the external display devices starts showing content directed to it, and
    stop showing content by renouncing a priority of the external display device on the list.

8. An apparatus comprising:
    at least one processor and at least one memory including a computer program code, the at least one memory and the computer program code being configured to, with the at least one processor, cause the apparatus at least to:
    obtain a list of user devices enabled to use the apparatus as an external display, wherein the user devices are on the list in a priority order, and wherein a user device enabled to use the apparatus is in the list regardless whether or not it is coupled to the apparatus;
    receive a use request from a user device that is not coupled to the apparatus;
    check the priority of the user device from the list;
    acknowledge the use request if the user device has the highest priority on the list of user devices, wherein a permission to use the apparatus triggers a coupling process between the apparatus and the user device, and
    obtaining a measure of distance from at least one user device to the apparatus based on signal strength for adjusting the priority order.

9. The apparatus of claim 8, wherein the at least one memory and the computer program code are further configured to, with the at least one processor, cause the apparatus to:
    adapt the list of user devices by adding devices, removing devices and/or changing the priority order.

10. The apparatus of claim 8, wherein the at least one memory and the computer program code are further configured to, with the at least one processor, cause the apparatus to:
    generate and convey an indication to the user device when starting showing content obtained from it.

11. The apparatus of claim 8, wherein the use request is a message from a user device conveyed wirelessly.

12. The apparatus of claim 8, wherein the at least one memory and the computer program code are further configured to, with the at least one processor, cause the apparatus to:
    inform user devices outside the list of user devices on displaying capacity, if no user devices on the list of user devices are available or no use requests are obtained.

13. The apparatus of claim 12, wherein the informing comprises measuring distances to user devices nearby based on signal strength.

14. The apparatus of claim 8, the apparatus comprising a display device.

15. A non-transitory computer-readable storage medium comprising a set of computer-readable instructions stored thereon, which, when executed by a processing system, cause the processing system to at least:
    obtain a list of user devices enabled to use the apparatus as an external display, wherein the user devices are on the list in a priority order, and wherein a user device enabled to use the apparatus is in the list regardless whether or not it is coupled to the apparatus;
    receive a use request from a user device that is not coupled to the apparatus;
    check the priority of the user device from the list;
    acknowledge the use request if the user device has the highest priority on the list of user devices, wherein a permission to use the apparatus triggers a coupling process between the apparatus and the user device,
    adapt the list of user devices by adding devices, removing devices and/or changing the priority order,
    generate and convey an indication to the user device when starting showing content obtained from it, and
    inform user devices outside the list of user devices on displaying capacity, if no user devices on the list of user devices are available or no use requests are obtained, wherein informing comprises measuring distances to user devices nearby based on signal strength, and
    adjusting priority order based upon the signal strength.

16. A method comprising:
    obtaining a list of suitable external display devices, wherein the external display devices are on the list in a priority order, the obtaining being carried out in the priority order, wherein the priority order is adjusted based upon a measurement of distance to at least one external display device based upon signal strength, sending a use request to an external display device having the highest priority on the list, receiving a response to the use request from the external display device, and in response to receiving a permission to use the external display device, coupling to the external display device for showing content, in response to not receiving a permission to use the external display, sending a use request to an external display device having the next highest priority on the list, and repeating the sending to an external display device having the next highest priority on the list until a permission to use is received.

17. The method of claim 16, further comprising:
adapting the list of suitable external display devices by adding, removing devices and/or changing the priority order.

18. The method of claim 16, further comprising:
renouncing a priority on the list and requesting at least one of the external display devices for use later on, if a need exists.

19. The method of claim 16, further comprising:
obtaining an indication, when at least one of the external display devices starts showing content directed to it.

20. The method of claim 16, further comprising:
stopping showing content by renouncing a priority on the list.

21. An apparatus comprising:
means for obtaining a list of suitable external display devices, wherein the external display devices are on the list in a priority order, the obtaining being carried out in the priority order,
means for sending a use request to an external display device having the highest priority on the list,
means for receiving a response to the use request from the external display device, and in response to receiving a permission to use the external display device, coupling to the external display device for showing content, in response to not receiving a permission to use the external display, sending a use request to an external display device having the next highest priority on the list, and repeating the sending to an external display device having the next highest priority on the list until a permission to use is received, and
means for measuring distance to at least one external display device on the list based on signal strength for adjusting the priority order.

22. The apparatus of claim 21 further comprising at least one of:
means for adapting the list of suitable external display devices By adding, removing devices and/or changing the priority order,
means for renouncing a priority on the list and requesting at least one of the external display devices for use later on, if a need exists,
means for obtaining an indication, when at least one of the external display devices starts showing content directed to it, and
means for stopping showing content by renouncing a priority on the list.

23. A method comprising:
obtaining a list of user devices enabled to use the apparatus as an external display, wherein the user devices are on the list in a priority order, and wherein a user device enabled to use the apparatus is in the list regardless whether or not it is coupled to the apparatus;
receiving a use request from a user device that is not coupled to the apparatus;
checking the priority of the user device from the list,
acknowledging the use request if the user device has the highest priority on the list of user devices, wherein a permission to use the apparatus triggers a coupling process between the apparatus and the user device, and
obtaining a measure of distance from at least one user device to the apparatus based on signal strength for adjusting the priority order.

24. The method of claim 23, further comprising:
adapting the list of user devices by adding devices, removing devices and/or changing the priority order.

25. The method of claim 23, further comprising:
generating and conveying an indication to a user device when starting showing content obtained from it.

26. The method of claim 23, wherein the use request is a message from a user device conveyed wirelessly.

27. The method of claim 23, further comprising:
informing user devices outside the list of user devices on displaying capacity, if no user devices on the list of user devices are available or no use requests are obtained.

28. The method of claim 27, wherein the informing comprises measuring distances to user devices nearby based on signal strength.

29. An apparatus comprising
means for obtaining a list of user devices enabled to use the apparatus as an external display, wherein the user devices are on the list in a priority order, and wherein a user device enabled to use the apparatus is in the list regardless whether or not it is coupled to the apparatus;
means for receiving a use request from a user device that is not coupled to the apparatus;
means for checking the priority of the user device from the list,
means for acknowledging the use request if the user device has the highest priority on the list of user devices, wherein a permission to use the apparatus triggers a coupling process between the apparatus and the user device, and
means for obtaining a measure of distance from at least one user device to the apparatus based on signal strength for adjusting the priority order.

30. The apparatus of claim 29 further comprising at least one of:
means for adapting the list of suitable external display devices by adding devices, removing devices and/or changing the priority order,
means for measuring distance to at least one external display device on the list based on signal strength for adjusting the priority order,
means for renouncing a priority on the list and request at least one of the external display devices for use later on, if a need exists,
means for obtaining an indication, when at least one of the external display devices starts showing content directed to it, and
means for stopping the showing content by renouncing a priority of the external display device on the list.

31. A non-transitory computer-readable storage medium comprising a set of computer-readable instructions stored thereon, which, when executed by a processing system, cause the processing system to at least:
obtain a list of suitable external display devices, wherein the external display devices are on the list in a priority order, the obtaining being carried out in the priority order, wherein the priority order is adjusted based upon a measurement of distance to at least one external display device based upon signal strength, send a use request to an external display device having the highest priority on the list, receive a response to the use request from the external display device, and in response to receiving a permission to use the external display device, coupling, to the external display device for showing content, in response to not receiving a permission to use the external display, send a use request to an external display device having the next highest priority on the list, and repeat the sending to an external display device having the next highest priority on the list until a permission to use is received.

32. A non-transitory computer-readable storage medium comprising a set of computer-readable instructions stored thereon, which, when executed by a processing system, cause the processing system to at least:

obtain a list of user devices enabled to use an apparatus as an external display, wherein the user devices are on the list in a priority order, and wherein a user device enabled to use the apparatus is in the list regardless whether or not it is coupled to the apparatus, receive a use request from a user device that is not coupled to the apparatus;

check the priority of the user device from the list, and acknowledge the use request, if the user device has the highest priority on the list of user devices, wherein a permission to use the apparatus triggers a coupling process between the apparatus and the user device, and adjusting priority order based upon a measurement of distance to at least one external display device based upon signal strength.

* * * * *